Figure 1:
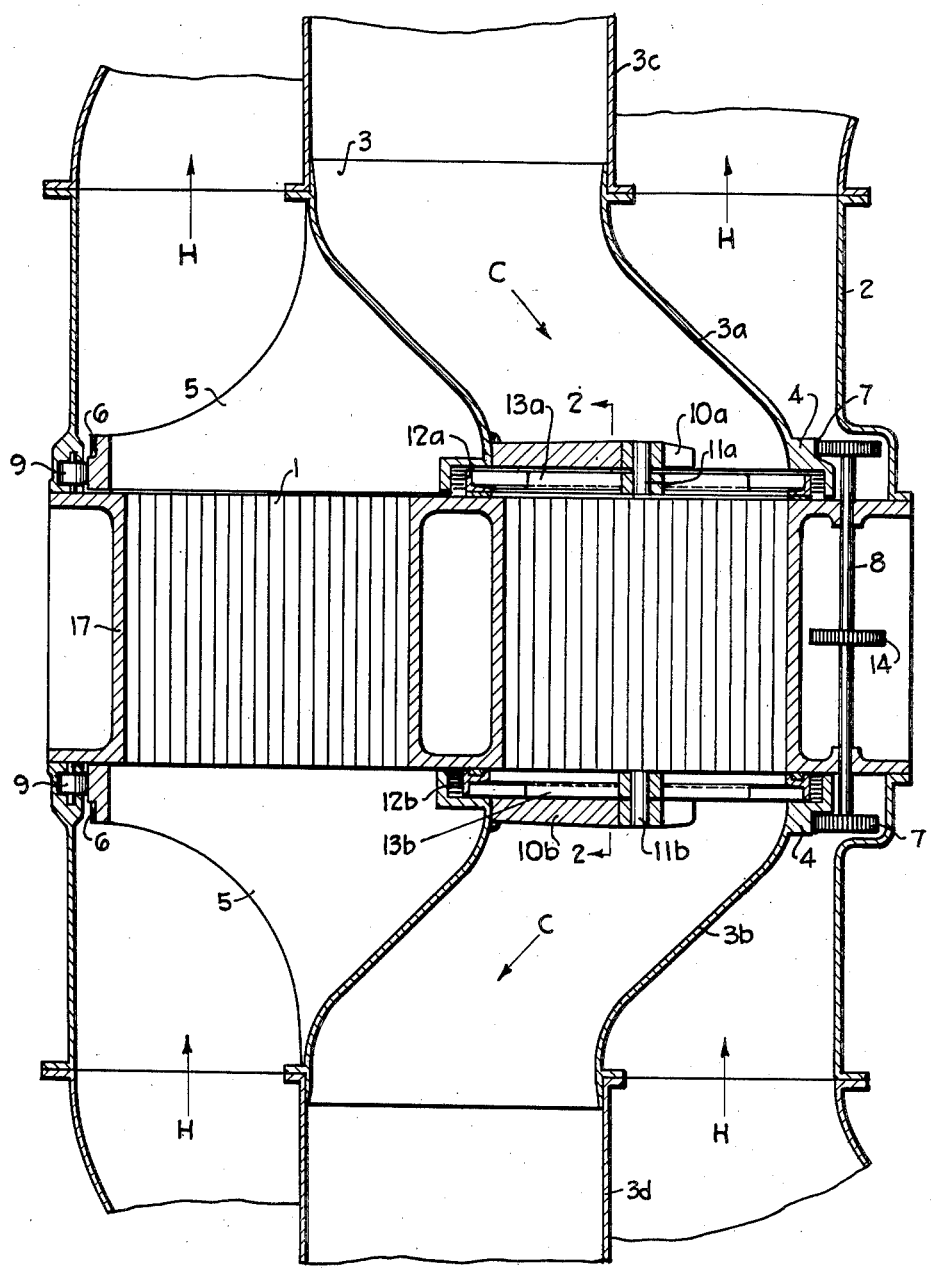

Inventor
William Tipler
By Oswald H. Milmore
his Attorney

Inventor:
William Tipler
By: Oswald H. Milmore
His Attorney

Dec. 23, 1952 W. TIPLER 2,622,850
MATRIX FOR HEAT REGENERATORS
Filed Feb. 2, 1951 3 Sheets-Sheet 3

Inventor:
William Tipler
By: Oswald H. Milmore
His Attorney

Patented Dec. 23, 1952

2,622,850

UNITED STATES PATENT OFFICE 2,622,850

MATRIX FOR HEAT REGENERATORS

William Tipler, London, England, assignor to Shell Development Company, San Francisco, Calif., a corporation of Delaware Application February 2, 1951, Serial No. 209,037
In Great Britain March 24, 1949

7 Claims. (Cl. 257—6)

This invention relates to heat regenerators of the kind in which the cyclic reversal of flow of the fluids through the heat-storing packing contained in the matrix is brought about by relative movement between a shutter or casing and the face of the matrix. Regenerators of this kind are hereinafter referred to as "regenerators of the kind specified." Such regenerators can be constructed with a relatively small size and weight and are of value when used in a gas turbine power plant, especially in such plant when used in an aircraft or land vehicle. It is difficult, however, to reconcile the small size of the regenerator with the low pressure drop which is also desired, again especially in gas turbine plant.

The matrix of a regenerator of the kind specified consists essentially of a set of parallel ducts the ends of which are swept by the relatively moving shutter, each duct containing a packing which consists of an aggregate of solid material which is pervious to the fluids taking part in the regenerative cycle of heating and cooling. In order to prevent leakage of the fluids, the shutter is provided with a seal which is as nearly fluid-tight as possible in the operating conditions. It will be understood that the width of the seal must be larger than the greatest dimension of the cross-section of any one duct, in order to prevent mixing of the hot and cold fluids.

One method of reducing the size of the regenerator is to compress the packing so that the interstices through which the fluids flow are reduced in size, but this results in an increase in the pressure drop experienced by fluid as it flows through the matrix. In order to reduce this pressure drop without increasing the volume of the matrix, the latter has been formed with a small depth in the direction of fluid flow and a large frontal area normal to this direction, a comparatively small depth of matrix being sufficient to enable an adequate temperature difference to be set up. A matrix of this shape, however, has certain disadvantages. It is difficult to provide the structure with adequate strength, especially where the fluid flowing through the matrix is at a high pressure, as in the case of gas turbines. Furthermore it is frequently inconvenient or impossible to fit a matrix of the shape in question into the ducting system of the apparatus in which the regenerator is to be used, and a large frontal or face area of the matrix materially increases the difficulty of sealing, since the leakage for a given type of seal increases as the total perimeter to be sealed increases. This latter difficulty is especially important when the pressure difference between the hot and cold fluids is large, as for instance, in the case of gas turbines.

The present invention consists in a matrix for a regenerator of the kind specified, which comprises a set of parallel ducts each having both ends open and substantially unobstructed for ingress and egress of fluids over the cross-section of the duct, and having a length measured in the general direction of fluid flow therethrough which is a multiple of its dimensions measured perpendicularly to this direction, and each containing at least one heat-accumulating gas-pervious packing member having the form of a wall or walls extending for the whole or the greater part of the length of the duct and of such shape and disposition that the packing member divides the duct into two chambers one of which is open without substantial obstruction to one of the ends of the duct, and the other is open without substantial obstruction to the other end of the duct, so that fluid flowing through the duct has to pass through the packing, but does not encounter other obstruction.

The ducts containing the packing may be rectangular, e. g. square in cross-section, the packing member having the form of a strip joined at one end of its ends to the walls of the duct at or near one end thereof, and extending diagonally across the duct to a point on the opposite wall at or near the other end of the duct. Each packing member may also have the form of a hollow cone, the base of which fits the walls of the duct and is joined thereto at substantially one end, while the apex is situated at substantially the other end of the duct on its longitudinal axis. The term "cone" as used here is to be understood as including a pyramidally shaped member which is to be used in connection with a duct of rectangular or square cross-section. Alternatively the ducts may have cross-sections that are closed conic sections such as circular or elliptical, and the packing member may have the form of a circular or elliptical cone the base of which fits the duct wall and is joined thereto at or near one end, while the apex is situated at or near the other end of the duct on its longitudinal axis. If required, a bracing member or members may extend from the duct wall to the apex of the cone or across the base thereof, these members being such that they do not substantially obstruct the duct. Likewise in a duct of square cross-section the packing member may consist of two strips each joined at one of its ends to one of two opposite edges at one end of the duct, the other ends of the strips being integral with or joined to one another to form an apex situated at the other end of the duct on its longitudinal axis. In cases where a high temperature difference is to be maintained between the two sides of the packing, it may be convenient to compose the packing of two parallel strips or cones rather than to use a single thick strip or cone. Thus, for example, there may be difficulty in constructing a hollow cone if the walls are unduly thick. The invention is not limited to the use of a matrix having a straight axis.

Where the outer envelope of the matrix is to be cylindrical, the matrix may conveniently be constructed from a number of blades radiating from a longitudinal member and fitting in a drum so that each duct is formed by an arc of the drum, two radiating blades, and an arc of the longitudinal member. The packing in the several ducts may conveniently be composed of a single strip which is wound over the blade edges in zig-zag formation.

As has been indicated above, the invention is especially useful when applied to regenerators for gas turbines, in which it is necessary to provide a high efficiency of heat exchange in a small volume, and with a minimum pressure drop of the gas or air passing through the regenerator.

It will be understood that in operation one end of the matrix will be maintained at a higher average temperature than the other. Where, as for example in gas turbine plant, the higher temperatures prevailing at that end of the matrix are such as to make the lubrication of the rubbing seal between the shutter and the face plate of the matrix difficult, it is advantageous to use packing members in the form of hollow cones or pyramids having their bases at the hot end of the matrix, at which end the walls of the members fit into the ducts and the latter are in good thermal contact with the rubbing face of the matrix. In this way the ducts are bathed throughout practically the whole of their length by the relatively cool fluid which is entering the ducts or by fluid which has been cooled by passage through the packing members, whereby the temperature of the matrix face in thermal contact with these ducts is lowered. Conversely, where the temperatures prevailing at the cold end of the matrix are sufficiently low to make lubrication difficult, as in liquid air machines, the conical or pyramidal packing members are arranged with their bases at the cold end of the matrix, whereby the temperature of the rubbing face at this end is raised. So in general the bases of the cones should be situated at that end of the matrix where extreme temperatures prevail which make lubrication difficult.

The material used for the packing members may be any highly subdivided material offering a high surface area per unit mass, and such material may, if necessary, be contained in a supporting member, provided the latter does not offer any appreciable resistance to the flow of liquid through the matrix. The preferred material, especially for regenerators used in gas turbines and like apparatus, is a heat-resisting metal, which may have the form of an assembly of superimposed layers of gauze, a suitably shaped mass of wire wool or mesh, or a porous metal sheet.

Figure 2:
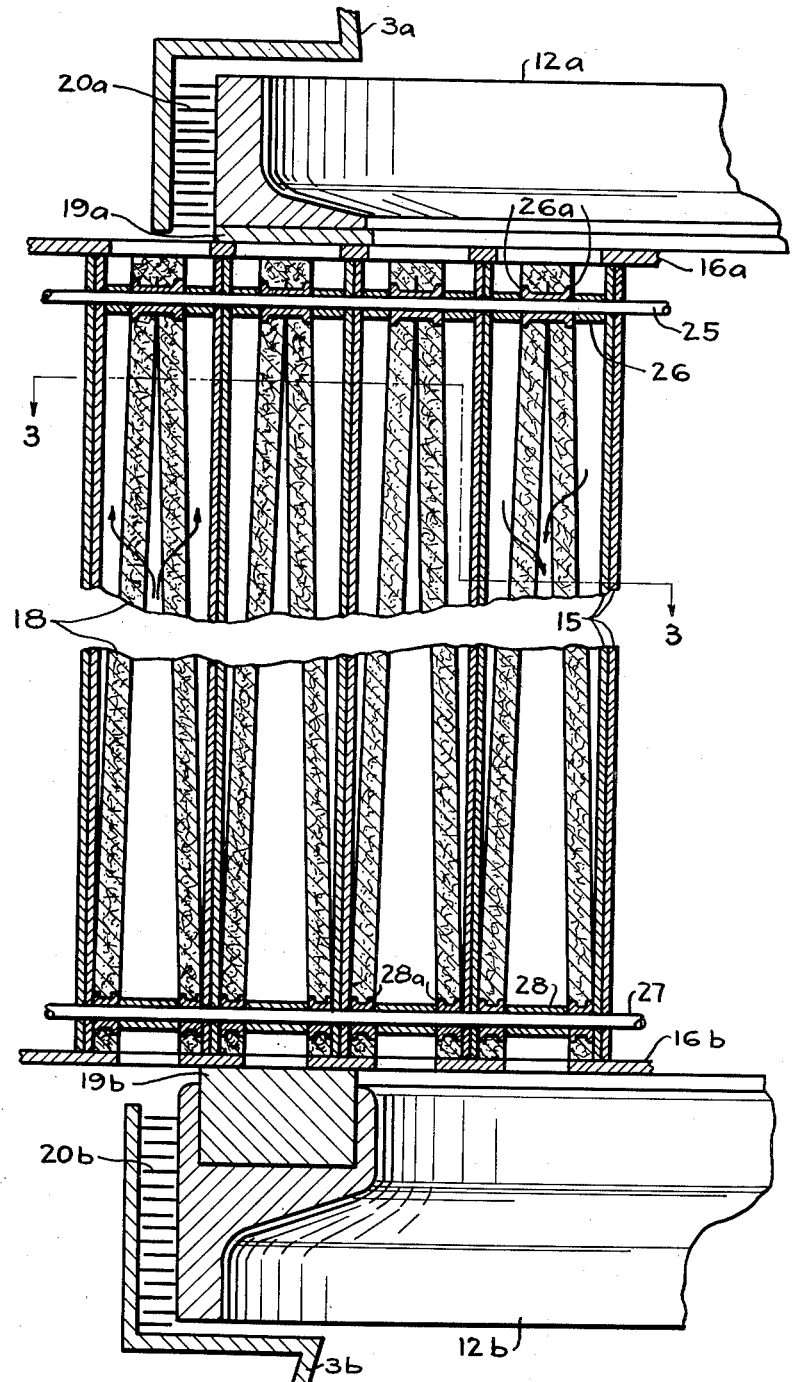
Figure 3:
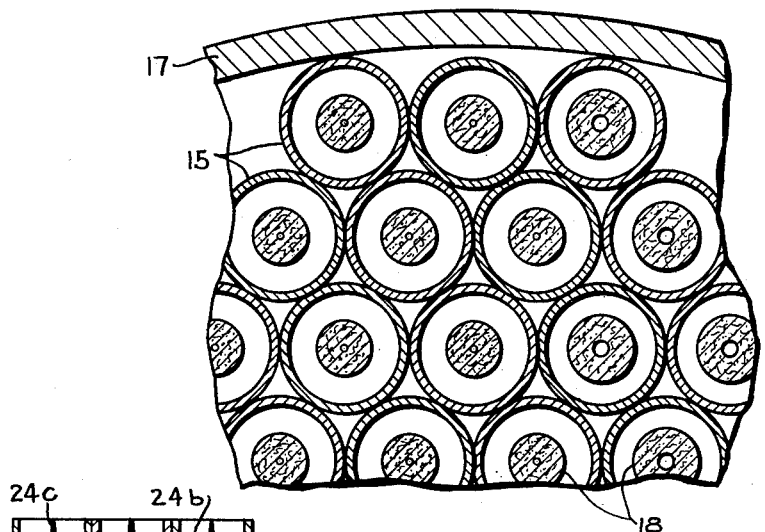
Figure 6:
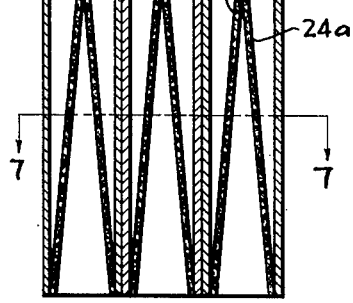
Figure 7:
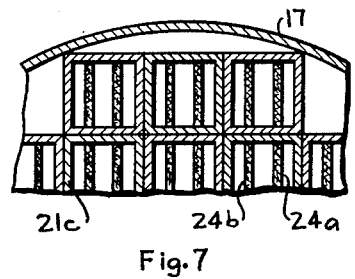
Figure 4:
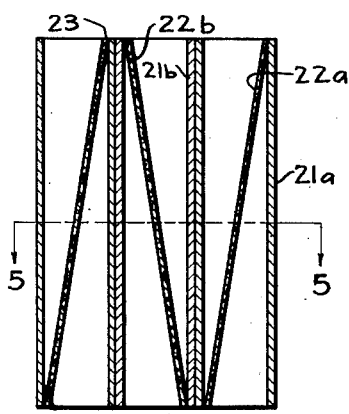
Figure 5:
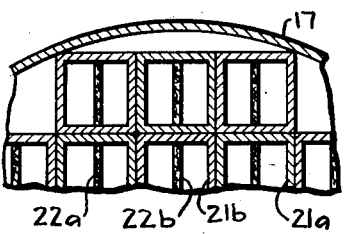

The invention is illustrated by way of example by the accompanying diagrammatic drawings, in which Figure 1 represents a longitudinal section of a rotary regenerator having a matrix embodying the invention, Figure 2 is a fragmentary section on an enlarged scale taken on the lines 2—2 of Figure 1, Figure 3 is a fragmentary section taken on broken line 3—3 of Figure 2, Figures 4 and 6 are fragmentary longitudinal sections of two alternate forms of the matrix, and Figures 5 and 7 are cross sections taken on correspondingly numbered lines of Figures 4 and 6, respectively.

The regenerator shown in Figures 1-3 is generally the same as one of those illustrated in United States Patent No. 2,578,945 dated December 18, 1951, with the further provision of a matrix embodying the present invention. The regenerator comprises a matrix 1 which is shown generally in Figure 1 and in more detail in Figures 2 and 3. The matrix 1 is of circular cross-sectional outline and is fixed across a duct 2 through which a hot fluid, for example the exhaust from a gas turbine plant, is caused to flow in the direction of the arrows H. Inside the duct 2 is a duct 3 which is built up of parts 3a, 3b, 3c and 3d, and through which a relatively cool gas, for example the air discharged from the compressor of the said gas turbine plant, is caused to flow in the direction of the arrows C. The duct 3 is circular in section throughout its length.

The parts 3c and 3d of the duct 3 are fixed relatively to the duct 2, while each of the parts 3a and 3b is carried by one of the rings 4, being integral with the ring at one side and supported by one of the webs 5 at the other. Each of the rings 4 is provided with gear teeth 6 which mesh with gear wheels 7 fixed on a shaft 8. The outer ends of the parts 3a and 3b fit respectively into the inner ends of the parts 3c and 3d in such a manner as to be rotatable therein, while the rings 4 are rotatably supported by rollers 9.

Fixed centrally to the inner ends of the duct parts 3a and 3b by means of spiders 10a and 10b are stub shafts 11a and 11b. Shutter rings 12a and 12b are carried by means of spokes 13a and 13b on the stub shafts 11a and 11b so as to be capable of rotation independently of the duct parts 3a and 3b.

The matrix 1 and shutter rings 12a and 12b are shown in more detail in Figure 2, which is an enlarged section on the line II—II of Figure 1 of the part of the matrix adjacent to the uppermost points of rings 12a and 12b (Figure 1 being regarded as horizontal). The matrix consists of a number of parallel cylindrical ducts 15 fixed by welding to face plates 16a and 16b which are carried by a housing 17. Fixed in each duct by means of rods 25 and 27, ferrules 26 and 28 and eyelets 26a and 28a respectively, is a conical packing member 18, the base of the cone facing towards the incoming stream of hot gas. Each cone divides the duct into two chambers, one inside and one outside the cone, each chamber having substantially unobstructed access to the duct 2 or 3 as the case may be, through holes in the face plates 16a and 16b.

The shutter rings 12a and 12b are provided with sealing rings 19a and 19b. The ring 19b which is at the hot end of the matrix is of a material selected to withstand the temperatures prevailing in operation and may be pressed against the face plate 16b by springs (not shown) arranged round its periphery to take up wear. Labyrinth seals 20a and 20b are provided between the rings 12a and 12b and the duct parts 3a, 3b.

In operation, the duct parts 3a and 3b are rotated by means of a gear wheel 14 fixed on the shaft 8, so that the shutter ring 12a and 12b sweep over the faces of the matrix 1 and the circular areas of these faces enclosed by the rings are constantly changing. As explained in the aforesaid British patent specification, the ability of the rings 12a and 12b to rotate independently of the rotating duct parts is instrumental in maintaining a good seal between the sealing rings 19a, 19b and the face plates 16a, 16b. It will be observed that the face plate 16b is exposed to gases which are at higher temperatures than those to which face 16a is exposed, these temperatures approaching that of the hot gas entering the duct 2; this would normally cause difficulty in lubrication. Owing to the arrangement of the cones 18, however, the ducts 15 are bathed over practically their whole length by relatively cool gas, those which are for the time being inside the rings 12a and 12b being in contact with cool gas which has entered the duct 3, and those which are outside the rings being in contact with gas which is about to leave the duct 2 and has been cooled by passage through the cones 18. Since the ducts 15 are welded to the face plate 16b and are thus in good thermal contact therewith, the face plate 16b is cooled substantially below the average temperature of the gases to which it is exposed.

The matrix shown diagrammatically in Figures 4 and 5 comprises a nest of square tubes 21a and 21b. Each tube 21a is divided in half by a diagonal packing member 22a connected to the walls of the tube. The adjacent tube 21b is likewise divided by a diagonal packing member 22b, the diagonals preferably running from opposite corners at one end and meeting at a common apex 23 at the other. Another form, shown in Figures 6 and 7, comprises a nest of square tubes 21c, each tube being provided with a packing member consisting of two flat strips 24a and 24b meeting at an apex 24c.

In each of the matrices shown the conical or diagonal arrangement of the packing members provides a large heat exchange surface with a small frontal area and a low pressure drop of the gases passing through the matrix.

I claim as an invention:

1. A heat-regenerative matrix comprising: a nest of a multiplicity of small parallel ducts in side-by-side relation along both the length and breadth of a section transverse to the ducts, each duct having a small cross-sectional area and having both ends open for free ingress and egress of fluids over substantially the full cross-section of the duct, and each duct having a length measured in the general direction of fluid flow therethrough which is a multiple of its dimensions measured perpendicularly to this direction; means for retaining said ducts in relatively fixed relation; at least one heat-accumulating gas-pervious packing member within each said duct having the form of at least one thin wall extending for at least the greater part of the length of the duct and having the margins thereof contiguous to all walls of the duct so as to divide the duct into two chambers communicating with one another only through said gas-pervious packing members, one of said chambers being freely open to one of the ends of the duct and the other chamber being freely open to the other end of the duct, so that fluid flowing through the duct has to pass through the packing, said packing member being the only obstruction within said duct; and means for securing said packing members within their respective ducts.

2. A matrix as claimed in claim 1, wherein each duct is rectangular in cross-section and each packing member has the form of a strip joined at one of its ends to a wall of the duct at or near one end thereof and extending diagonally across the duct to the opposite wall at a point substantially at the other end of the duct.

3. A matrix as claimed in claim 1, wherein the ducts are rectangular in cross-section and the packing member consists of two strips each joined at one of its ends to a different one of two opposite edges at one end of the duct, the other ends of the strips forming an apex situated at the other end of the duct on its longitudinal axis.

4. A matrix as claimed in claim 1, wherein each packing member has the form of a hollow cone, the base of which fits the walls of the duct and is joined thereto peripherally at substantially one end, while the apex is situated at substantially the other end of the duct on its longitudinal axis.

5. A matrix as claimed in claim 4 wherein the means for securing the packing within the ducts comprise retaining rods extending transversely through the walls of the ducts and the cone-shaped packing member.

6. A matrix according to claim 4 wherein the means for securing the packing within the ducts comprise: eyelets fixed to the cone-shaped packing members having bores extending transversely with respect to the cone axes; ferrules between the eyelets and the walls of the duct; and rods extending transversely through the walls of the ducts and through said eyelets and ferrules.

7. A heat-regenerative matrix comprising: a nest of a multiplicity of small parallel ducts in side-by-side relation along both the length and breadth of a section transverse to the ducts, each duct having a small cross-sectional area and having both ends open for free ingress and egress of fluids over substantially the full cross-section of the duct, and each duct having a length measured in the general direction of fluid flow therethrough which is a multiple of its dimensions measured perpendicularly to this direction; means for retaining said ducts in relatively fixed relation; a face plate at each end of the matrix fixed to the ends of said ducts and adapted for rubbing engagement with shutter means, each of said face plates having openings in registry with said ducts to permit unobstructed passage of fluid through the respective plate into and out of the ducts; at least one heat-accumulating gas-pervious packing member within each said duct having the form of a wall shaped as a hollow cone the base of which is in good thermal contact peripheral with the walls of the duct substantially at one end thereof and all other parts of said cone including the apex thereof being spaced from said duct walls, so as to divide each duct into two chambers communicating with one another only through said gas-pervious packing member, one of said chambers being freely open to one of the ends of the duct and the other chamber being freely open to the other end of the duct, so that fluid flowing through the duct has to pass through the packing, said packing member being the only obstruction within said duct, all of the cones in the several ducts having their bases at the same end of the matrix and the length of said cone from the base to said apex being at least a major part of the length of the duct; and means for securing said packing members within their respective ducts.

WILLIAM TIPLER.

REFERENCES CITED

The following references are of record in the file of this patent:

UNITED STATES PATENTS

| Number | Name | Date |
|---|---|---|
| 682,488 | O'Brien | Sept. 10, 1901 |
| 899,899 | Petersen | Sept. 29, 1908 |
| 1,641,148 | Bassler | Sept. 6, 1927 |
| 1,858,508 | Kignell et al. | May 17, 1932 |
| 2,053,159 | Miller | Sept. 1, 1936 |
| 2,212,932 | Fairlie | Aug. 27, 1940 |
| 2,222,721 | Ramsaur et al. | Nov. 26, 1940 |
| 2,266,219 | Larriva | Dec. 16, 1941 |

FOREIGN PATENTS

| Number | Country | Date |
|---|---|---|
| 614,453 | Great Britain | Dec. 15, 1948 |
| 62,771 | Sweden | Apr. 13, 1927 |
| 268,287 | Switzerland | Sept. 1, 1950 |